(12) United States Patent
Alhubail

(10) Patent No.: US 11,945,608 B2
(45) Date of Patent: Apr. 2, 2024

(54) APPARATUS, SYSTEMS AND METHODS FOR CONTROLLING A SPACECRAFT DURING ATMOSPHERIC REENTRY

(71) Applicant: Jasem Alhubail, Hateen (KW)

(72) Inventor: Jasem Alhubail, Hateen (KW)

(*) Notice: Subject to any disclaimer, the term of this patent is extended or adjusted under 35 U.S.C. 154(b) by 243 days.

(21) Appl. No.: 17/525,496

(22) Filed: Nov. 12, 2021

(65) Prior Publication Data

US 2022/0063844 A1 Mar. 3, 2022

Related U.S. Application Data

(63) Continuation-in-part of application No. 17/405,784, filed on Aug. 18, 2021, which is a continuation-in-part of application No. PCT/IB2020/055651, filed on Jun. 17, 2020.

(60) Provisional application No. 63/202,777, filed on Jun. 24, 2021, provisional application No. 63/202,275, filed on Jun. 3, 2021, provisional application No. 63/202,184, filed on May 30, 2021, provisional application No. 63/202,181, filed on May 29, 2021, provisional application No. 63/201,421, filed on Apr. 29, 2021, provisional application No. 63/200,998, filed on Apr. 7, 2021.

(51) Int. Cl.
  *B64G 1/62* (2006.01)
  *B64G 1/14* (2006.01)
  *B64G 1/24* (2006.01)

(52) U.S. Cl.
  CPC ............... *B64G 1/62* (2013.01); *B64G 1/14* (2013.01); *B64G 1/24* (2013.01)

(58) Field of Classification Search
  CPC ............... B64G 1/62; B64G 1/14; B64G 1/24
  See application file for complete search history.

(56) References Cited

U.S. PATENT DOCUMENTS

| 2007/0018033 A1* | 1/2007 | Fanucci | F42B 15/22 244/49 |
| 2023/0150700 A1* | 5/2023 | Dunn | B64G 1/002 701/16 |
| 2023/0160671 A1* | 5/2023 | Gomez de Avila Diaz | F42B 10/64 244/3.24 |

FOREIGN PATENT DOCUMENTS

CN 109747860 A * 5/2019

* cited by examiner

*Primary Examiner* — Valentina Xavier

(57) ABSTRACT

A spacecraft that is capable of re-entry into an atmosphere includes an airframe, including a body and one or more wings, and one or more propulsion devices, for example, rocket engines, reaction control thrusters, and jet engines. One or more louver systems are incorporated into the airframe to assist in controlling the aerodynamic profile of the spacecraft. The louver system includes a number of fins rotatable about and axis. An actuator system may rotate the fins in unison or independently of the other fins. A controller may receive information from sensors incorporated into the airframe and send instructions to the actuator system to rotate the fins in response to the sensor information in order to achieve a calculated aerodynamic profile. The spacecraft may also include retractable landing legs. One or more of the wings may be an actuated wing.

5 Claims, 7 Drawing Sheets

APPARATUS, SYSTEMS AND METHODS FOR CONTROLLING A SPACECRAFT DURING ATMOSPHERIC REENTRY

CROSS-REFERENCE TO RELATED APPLICATIONS

This application claims priority to International Application No. PCT/IB2020/055651, filed Jun. 17, 2020, and entitled, "AN APPARATUS FOR CONTROLLING A SPACECRAFT'S ATMOSPHERIC REENTRY", U.S. Provisional Patent Application No. 63/200,998, filed Apr. 7, 2021, and entitled "SYSTEMS AND METHODS FOR CONTROLLING A SPACECRAFT DURING ATMOSPHERIC RE-ENTRY", U.S. Provisional Patent Application No. 63/201,421, filed Apr. 29, 2021, and entitled "SYSTEMS AND METHODS FOR CONTROLLING A SPACECRAFT DURING ATMOSPHERIC RE-ENTRY", U.S. Provisional Patent Application No. 63/202,181, filed May 29, 2021, and entitled "SYSTEMS AND METHODS FOR CONTROLLING A SPACECRAFT DURING ATMOSPHERIC RE-ENTRY", U.S. Provisional Patent Application No. 63/202,184, filed May 30, 2021, and entitled "SYSTEMS AND METHODS FOR CONTROLLING A SPACECRAFT DURING ATMOSPHERIC RE-ENTRY", U.S. Provisional Patent Application No. 63/202,275, filed Jun. 3, 2021, and entitled "SYSTEMS AND METHODS FOR CONTROLLING A SPACECRAFT DURING ATMOSPHERIC RE-ENTRY", U.S. Provisional Patent Application No. 63/202,777, filed Jun. 24, 2021, and entitled "SYSTEMS AND METHODS FOR CONTROLLING A SPACECRAFT DURING ATMOSPHERIC RE-ENTRY", and U.S. patent application Ser. No. 17/405,784, filed Aug. 18, 2021, and entitled "APPARATUS, SYSTEMS AND METHODS FOR CONTROLLING A SPACECRAFT DURING ATMOSPHERIC REENTRY" the entire contents of which are incorporated herein.

TECHNICAL FIELD

The present disclosure is in the field of aerospace vehicles, and pertains more particularly to systems and methods for controlling a spacecraft from the moment of atmospheric re-entry until landing.

BACKGROUND

Existing aerospace companies are utilizing bulky wings or flaps in order to control a spacecraft's orientation during its descent into the atmosphere. Due to their heavier weight and larger size, these systems are generally not fast or precise enough to correct for the fast hypersonic turbulences that occur during atmospheric re-entry, nor are they well equipped to re-orientate after a destabilization that occurs from such a turbulence. Furthermore, these systems are not well equipped to prevent loss of control, during the landing maneuver, due to the boundary layer separation that occurs due to the low flying speeds that occur just before landing. Also, due to the sizes and weights of these systems, they require high torque to actuate, which in turn, requires higher power actuation systems and larger and heavier actuation system parts, due to the higher induced strain on the actuation system parts.

For example, FIG. 1 shows a perspective view of a Space Shuttle Orbiter 100, a known orbital vehicle (OV) of the class Enterprise, Columbia, Discovery, etc. The Space Shuttle includes several aero-surfaces including elevons 102, body flap 104, and split rudder/speed brake 106. These are all relatively large and heavy actuation system parts, as shown by the proportionate sizes relative to the size of the body of the Space Shuttle 100, as shown in FIG. 1.

Therefore, there is a need for an aerodynamic control system that utilizes smaller and lighter parts and offers greater control and accuracy in correcting for turbulence and other challenges inherent to atmospheric reentry and landing.

SUMMARY

In an embodiment, an aerodynamic system utilizes apparatus, e.g., multiple fins or flaps, to reduce the torque required to actuate each fin or flap, reducing the strain on its actuation system's parts, and assisting in maneuvering the spacecraft during atmospheric re-entry. Providing smaller, lighter actuation system's parts allows the entire aerodynamic system to be faster, more precise, and able to correct for faster turbulences. Due to this proposed aerodynamic system dividing its aerodynamic control surfaces to smaller lighter parts and reducing the strain on its parts. It reduces the chances of a system failure.

In an embodiment, a spacecraft capable of re-entry into atmosphere includes an airframe, including a body and one or more wings, and one or more propulsion devices, for example, rocket engines, reaction control thrusters, and jet engines.

One or more louver systems are incorporated into the airframe to assist in controlling the orientation of the spacecraft. The louver system includes a number of fins rotatable about an axis. An actuator system may rotate the fins in unison or independently of the other fins.

A controller may receive information from sensors incorporated into the airframe and send instructions to the actuator system to rotate the fins in response to the sensor information in order to achieve a calculated aerodynamic profile. The spacecraft may also include retractable landing legs. One or more of the wings may be an actuated wine.

DETAILED DESCRIPTION

In an embodiment, an aerodynamic louver system may be used in one or more of the following operations: control, adjust, or stabilize, aid in controlling, adjusting or stabilizing a spacecraft's orientation, angle of attack, lift, or position. There could be multiple of these systems on the spacecraft's body, working together to control the aerodynamic forces acting on the body of the spacecraft.

The louver system may be on a fixed wing, or a moving wing, or other portions of the airframe of the spacecraft. The fins may move in unison or independently from each other. The fins may be actuated by an electric motor system, a hydraulic system, or other types of actuator systems. The fins can be actuated to control the aerodynamic forces acting on the body of the spacecraft, by adjusting the surface area distribution of the spacecraft.

Figure 1:
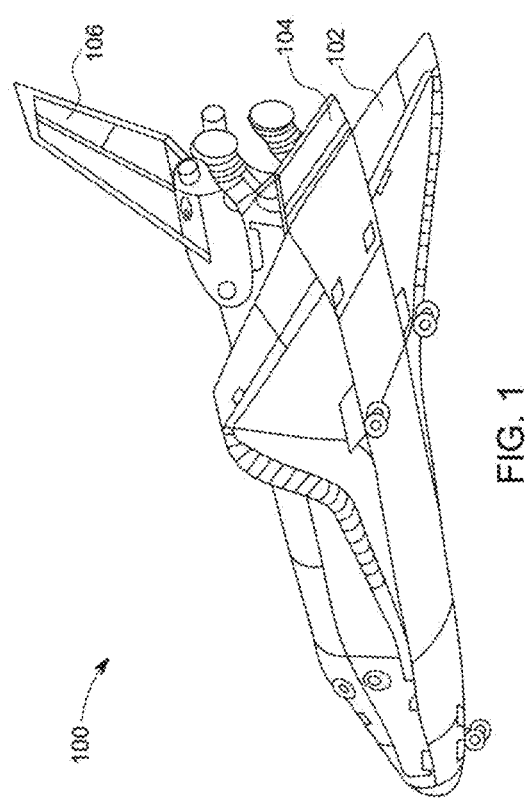
FIG. 1 is a perspective view of a known spacecraft.
Figure 2:
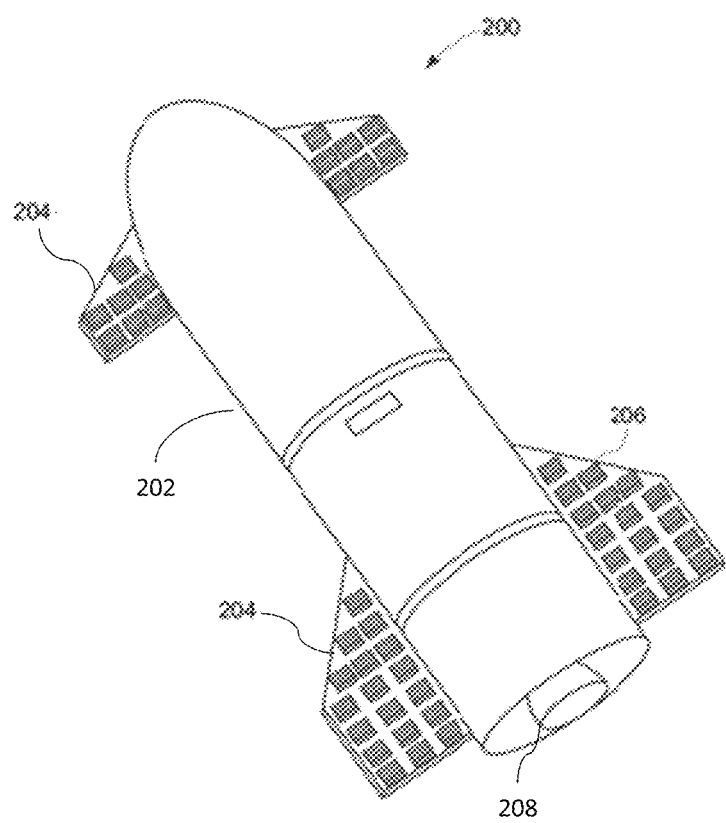
FIG. 2 is a plan view of a spacecraft including a louver system according to an embodiment.

FIG. 2 shows a spacecraft 200 according to an embodiment. The spacecraft may be capable of re-entry from space into an atmosphere. The spacecraft may include an airframe having a body 202, one or more wings 204, one or more louver systems 206 incorporated into the body 202 and/or the wing(s) 204, as well as a rocket engine 208. Although FIG. 2 shows a spacecraft with a single engine rocket system, other rocket types and configurations may be used, for example, multiple rocket engines. The term "airframe" in this context refers to the common definition of the basic structure of an airplane or spacecraft excluding its power plant and instrumentation; its principal components thus including the wings, fuselage, tail assembly, and landing gear.

Figure 3:
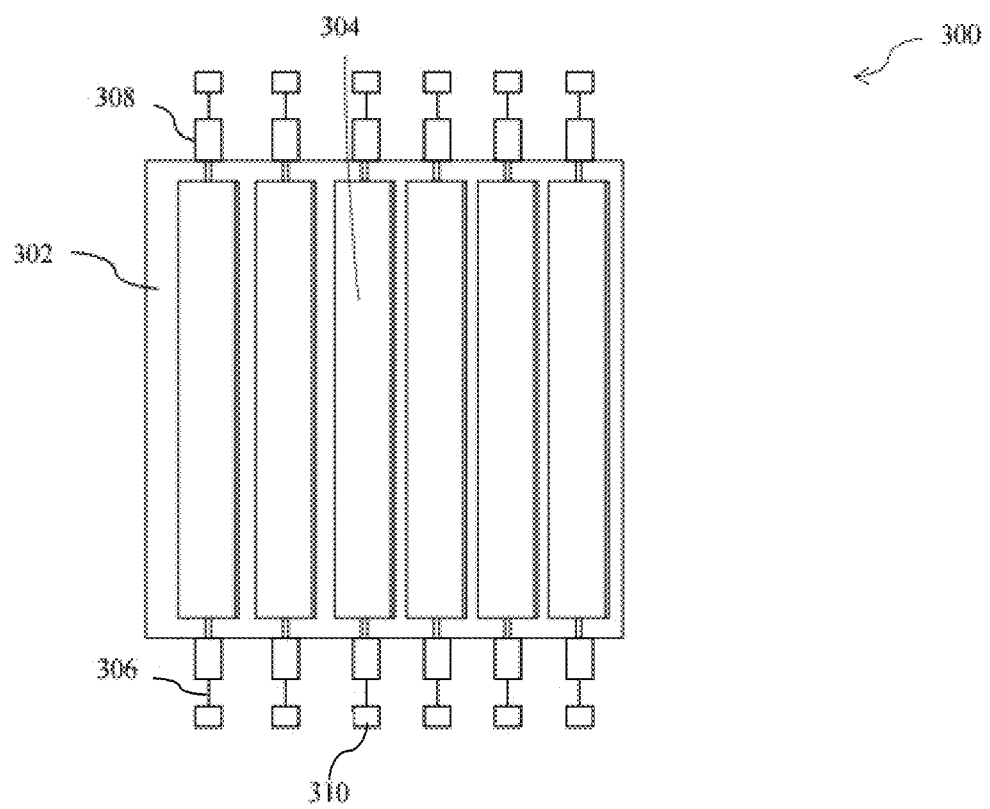
FIG. 3 is a plan view of a louver system according to an embodiment.

As shown in FIG. 3, a louver system 300 according to an embodiment may include a frame 302 and a number of fins 304, each fin being rotatable about an axis defined by a fin rod 306, and an actuator system to rotate the one or a group of fins independently from the other louver system(s). The louver system may aid in controlling the orientation or trajectory of the spacecraft when it enters atmosphere.

In an embodiment, the louver system 300 may include one or more actuators 308 connected between a portion of the frame and a fin, or to one or both ends of a fin rod. The actuators may be capable of rotating one or more fins independently of the other fins to provide more control and precision. The actuator system may include, for example, electric motors, hydraulics, gears, levers, etc., in order to increase torque and precision of the actuator system.

Figure 4:
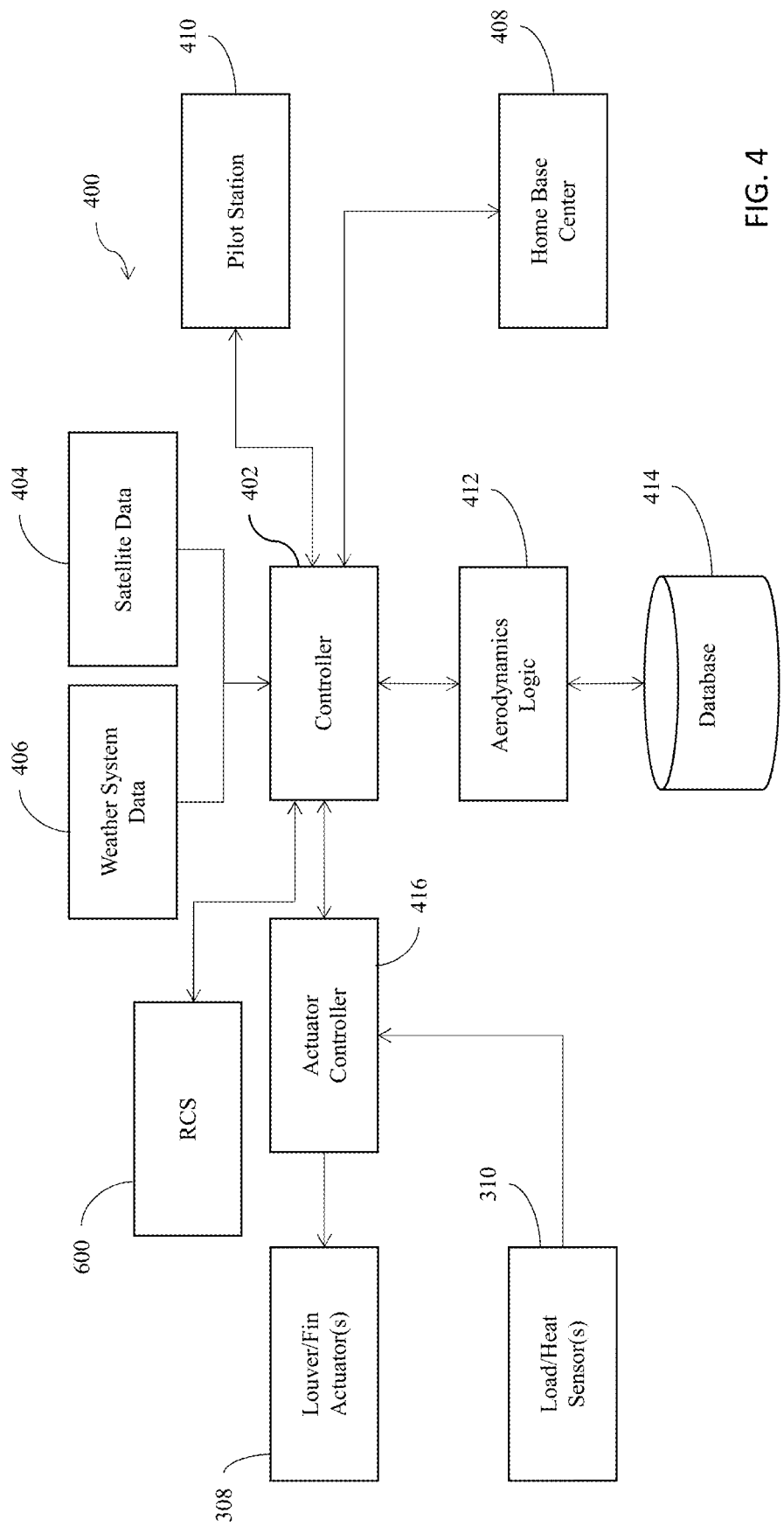
FIG. 4 is a block diagram for a control system according to an embodiment.

In addition to the numerous sensors typical spacecraft and spaceplanes include in their wings, body, and airframe generally, such as heat and air force/load sensors and accelerometers, the fins themselves may include sensors 310 along their axes. These sensors may include, for example, load sensors and/or heat sensors. These sensors can send signals to a controller 402, as shown in FIG. 4, which shows a control system 400.

Figure 5:
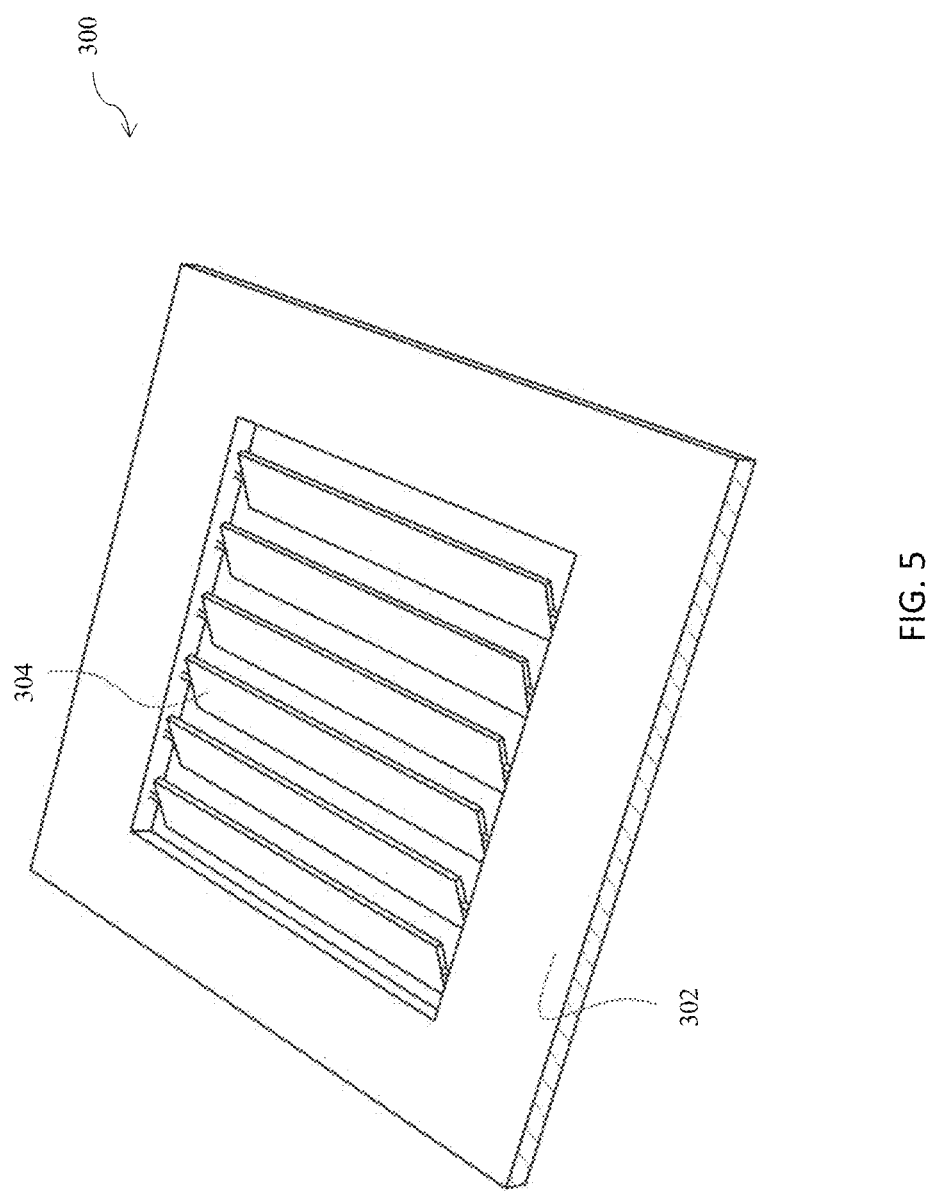
FIG. 5 is a perspective view of a louver system according to an embodiment.

FIG. 5 shows the fins 304 in a partially open position. During reentry, the fins may be subject to extreme forces as the spacecraft moves at high speeds through the upper atmosphere. This can create force on the fins and actuators as well as generate extreme heat due to the friction created by the air molecules hitting the fins and other surfaces of the spacecraft at supersonic speeds. The sensors can measure the force and/or heat being experienced by the fins and send this information to the controller 400. In instances where the forces on and/or temperature of the fins exceed operational parameters, the controller 400 may completely or partially close the fins to reduce the exposed surface area of the fin(s), thereby decreasing the force and friction generated by contact with the high speed interaction with the air. The controller 400 may also notify the pilot station (cockpit).

Prior to reentry into the atmosphere, a spacecraft may be oriented into a desired position, for example, tail first in the case of the Space Shuttle, before a deorbit burn with the orbital maneuvering system engines. This maneuver may be accomplished using a reaction control system (RCS), which may include thrusters and reaction control wheels to provide attitude control, and sometimes propulsion.

Figure 6:
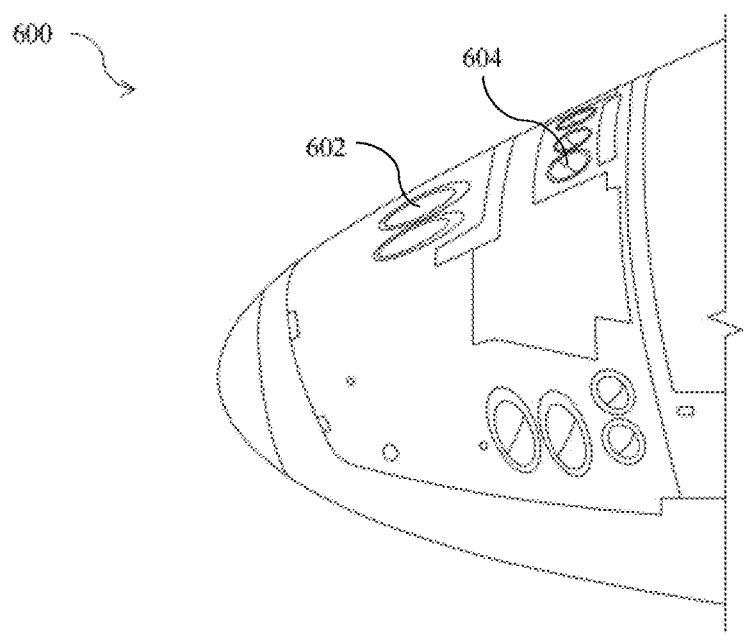
FIG. 6 is a perspective view of a reaction control system according to an embodiment.

An RCS is capable of providing small amounts of thrust in any desired direction or combination of directions. An RCS is also capable of providing torque and momentum to allow control of rotation (roll, pitch, and yaw). In an exemplary RCS 600 shown in FIG. 6, the RCS may use a combination of large thrusters 602 and small (vernier) thrusters 604 to allow different levels of response.

The RCS 600 may be used for attitude control during re-entry. The louver system(s) 300 may aide in attitude control when the spacecraft reenters the atmosphere. The controller 400 can determine which louver fins to actuate, and to which extent to rotate them, in order to provide a correct aerodynamic surface to achieve the desired effect or maneuver.

Returning to FIG. 4, the control system 400 includes the controller 402, which may receive information from multiple sources. These include the various sensors in the airframe, including the sensors 310 for the fins. The controller 402 may also receive information from satellite(s) 404, weather service(s) 406, as well as from the terrestrial base station 408 and onboard pilot station 410.

The controller 402 may use aerodynamics logic 412 as well as information from a database 414 to determine which fins to actuate and to what degree in order to create a preferred aerodynamic profile for the specific conditions of the re-entry into atmosphere. The controller 402 can send control instructions to an actuator controller 416 to operate the desired fins. The controller may also activate the RCS 600 for corrections in pitch, yaw, and roll to optimize the attitude of the spacecraft before and during re-entry.

The louver system(s) may complement the other aerodynamic structures, e.g., wings and rudder, in the airframe. Operation of the louvers may depend on operational heat and load tolerances reported by the sensors 310.

As described above, once the spacecraft reenters the atmosphere, it may be at high speeds (supersonic) and must plow through the fluid air of the upper atmosphere. In the portion the spacecraft serving as the front during reentry, a shock wave results when air molecules bounce off the front of the vehicle and then collide with the incoming air. As the shock wave hits the air molecules in front of the re-entering vehicle, they go from a cool, dormant state to an excited state, acquiring heat energy. For example, the Space Shuttle OV experienced surface temperatures ranging from 927° C. (1,700° F.) to 1,600° C. (3,000° F.) during reentry. As such, the fins 304 and other components of the louver system 300 may need to withstand extreme heat during reentry.

The fins may include materials in their construction used in known thermal protection systems. These include known materials, such as ablative materials, thermal soak, reinforced carbon-carbon (RCC), various known silicate ceramics and fibrous insulation materials, etc. Also contemplated are materials currently being developed for thermal protection systems, such as various composites, diamond films, spray on thin films, metallized polymer based films, etc.

The Space Shuttle has been described as a high technology glider during and after reentry as the main engines cut off. In an embodiment, the spacecraft 200 may include actuated wing(s) to facilitate more precision and control of the orientation and trajectory of the spacecraft during atmospheric re-entry, and before landing. The actuated wing(s) could be used to prevent the spacecraft 200 from toppling over after landing and when on the ground due to the various situations, including, for example, a strong wind, uneven ground, broken landing leg, damaged landing leg, broken spacecraft's body, damaged spacecraft's body, etc. This could be done by providing the actuated wings with one or more extensions that could be actuatable or fixed extensions, that can touch the ground to support the spacecraft's weight, and then folding the actuated wings in the direction required to counteract the toppling force. The actuated wings may be actuated or folded by the use of the one or more reaction control thrusters, an actuation system, or both.

In an embodiment, the spacecraft 200 may have a spaceplane-like design including one or more jet engines to facilitate more precision, redundancy, and control of the orientation and trajectory of the spacecraft for runway landings.

In an embodiment, the spacecraft 200 may include ballistic anchoring device(s) positioned, for example, on the top of the spacecraft to secure the spacecraft to the ground in the case of a toppling force, such as those described above. The ballistic anchoring device may include a penetrator head and a wire that extends from the back of the penetrator head to the spacecraft. The penetrator head may penetrate the ground after being fired from the spacecraft. The penetrator head may be constructed from a hard, heavy metal, such as tungsten, to enable it to penetrate the ground in the case of the ground consisting of, or being covered by, hard or dense rock. The reaction control thrusters may also be used in conjunction with the ballistic anchoring devices, for example, on the opposite side, to fire and counteract the toppling force and the force of firing the ballistic anchoring device(s).

In an embodiment, a spacecraft that is capable of re-entry into an atmosphere may use a number of louvers to maneuver the spacecraft during atmospheric re-entry. The louver system may be used to control the aerodynamic profile of the spacecraft by utilizing the louvers to control the size and/or shape of the projected area perpendicular to the trajectory of the spacecraft that is blocking the path of the incoming atmospheric fluid (e.g., air, water) molecules in different places on the spacecraft's body during atmospheric re-entry.

The louver system may control the amount of the atmospheric fluid molecules that can pass through the openings in the louver, by controlling the degree at which the louver is open or closed and rotating the louver's fins to the required position.

The louvers may include "micro-fins" which may be actuated individually, or in concert. The fins may have smaller chords (the distance between the leading and trailing edge of the surface) than the larger aerodynamic surfaces, such as the elevons, rudder, vertical stabilizer, etc. As shown in FIG. 2, the aerodynamic surface of the vehicle may include a number of louver structures, each louver system 206 including a number of fins, which may be individually controlled based on information from the controller 402, as shown in FIG. 4. The information may be generated by the aerodynamics logic unit 412, processed by the controller 402, and passed to the actuator controller 416.

The number of louver systems 206 and the ability to individually control the fins provide a great opportunity for creating small, or large, changes in the aerodynamic profile of the vehicle, with precise control based on all of the inputs regarding the re-entry conditions.

Figure 7:
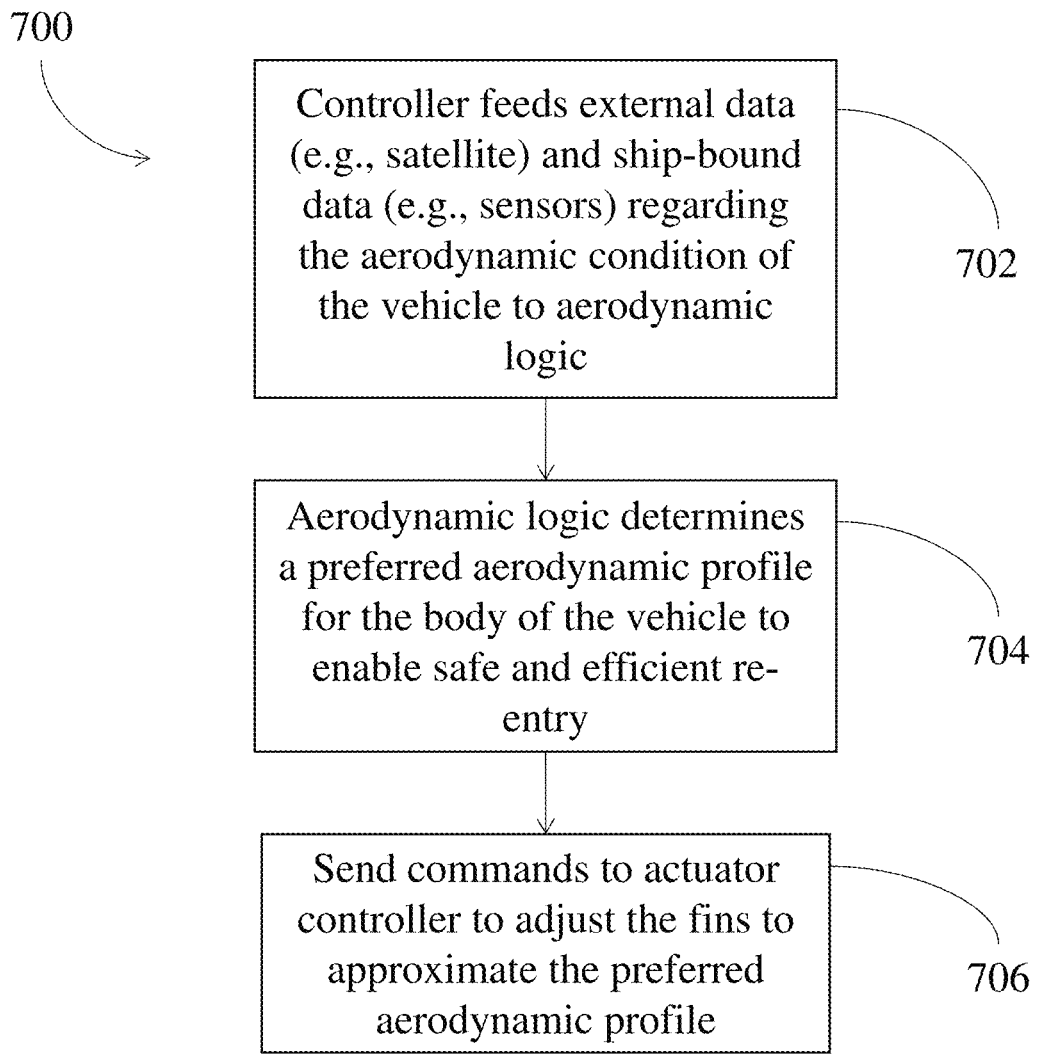
FIG. 7 is a flowchart showing a maneuvering method according to an embodiment.

FIG. 7 is a flowchart showing a maneuvering method 700 according to an embodiment. In an embodiment, the controller 402 feeds external data (e.g., satellite) and ship-bound data (e.g., sensors) regarding the aerodynamic condition of the vehicle to the aerodynamic logic 412 (step 702). The aerodynamic logic 412 determines a preferred aerodynamic profile for the body of the vehicle to enable safe and efficient re-entry (step 704). The controller 402 then sends commands to the actuator controller 416 to adjust the fins in various louver systems to approximate the preferred aerodynamic profile and maneuver the vehicle (step 706).

Various illustrative logical blocks, modules, components, circuits, and algorithmic operations described in connection with the aspects described herein may be implemented as electronic hardware, computer software, or combinations of both. To clearly illustrate this interchangeability of hardware and software, various illustrative components, blocks, modules, circuits, operations, etc. have been described herein generally in terms of their functionality. Whether such functionality is implemented as hardware or software depends upon the particular application and design constraints imposed on the overall system. One of skill in the art may implement the described functionality in varying ways for each particular application, but such implementation decisions should not be interpreted as causing a departure from the scope of the claims.

The hardware used to implement various illustrative logics, logical blocks, modules, components, circuits, etc. described in connection with the aspects described herein may be implemented or performed with a general purpose processor, a digital signal processor ("DSP"), an application specific integrated circuit ("ASIC"), a field programmable gate array ("FPGA") or other programmable logic device, discrete gate logic, transistor logic, discrete hardware components, or any combination thereof designed to perform the functions described herein. A general-purpose processor may be a microprocessor, a controller, a microcontroller, a state machine, etc. A processor may also be implemented as a combination of receiver smart objects, e.g., a combination of a DSP and a microprocessor, a plurality of microprocessors, one or more microprocessors in conjunction with a DSP core, or any other such like configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions (or code) on a non-transitory computer-readable storage medium or a non-transitory processor-readable storage medium. The operations of a method or algorithm disclosed herein may be embodied in a processor-executable software module or as processor-executable instructions, both of which may reside on a non-transitory computer-readable or processor-readable storage medium. Non-transitory computer-readable or processor-readable storage media may be any storage media that may be accessed by a computer or a processor (e.g., RAM, flash memory, etc.). By way of example but not limitation, such non-transitory computer-readable or processor-readable storage media may include RAM, ROM, EEPROM, NAND FLASH, NOR FLASH, M-RAM, P-RAM, R-RAM, CD-ROM, DVD, magnetic disk storage, magnetic storage smart objects, or any other medium that may be used to store program code in the form of instructions or data structures and that may be accessed by a computer. Disk as used herein may refer to magnetic or non-magnetic storage operable to store instructions or code. Disc refers to any optical disc operable to store instructions or code. Combinations of any of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The invention claimed is:

1. A spacecraft capable of re-entry into atmosphere, the spacecraft comprising:
an airframe including a body;
a plurality of aerodynamic louver systems, each louver system incorporated into a different portion of the airframe and comprising:
a plurality of fins, each fin rotatable about an axis between a closed position and an open position, wherein the axis of each fin is parallel to the axis of an adjacent fin;
an actuator system operative to rotate each of said plurality of fins in each of the louver systems independently or in concert between the closed position and the open position and a range of angles between the closed position and the open position;
an aerodynamic logic module; and
a controller operative to send data regarding the aerodynamic condition of the spacecraft to the aerodynamic logic module,
wherein the aerodynamic logic is operative to determine a preferred aerodynamic profile for the plurality of fins, and
wherein the aerodynamic logic is operative to control the actuator system to adjust the fins in one or more of the louver systems to approximate the preferred aerodynamic profile.

2. The spacecraft of claim 1, wherein:
the controller is further operative to control the aerodynamic profile of the spacecraft by utilizing the louver systems to control the projected area perpendicular to the trajectory of the spacecraft using the fins, thereby blocking the path of the incoming atmospheric fluid molecules in different places on the spacecraft's body during atmospheric re-entry.

3. The spacecraft of claim 2, wherein the controller is operative to control the amount of atmospheric molecules that can pass through openings in the louver systems between the fins.

4. The spacecraft of claim 2, wherein the controller is operative to control the degree at which the individual fins in each louver system are open or closed.

5. The spacecraft of claim 2, wherein the controller is operative to control a rotation the fins in each louver system to a designated position.

* * * * *